Jan. 15, 1957  G. E. RUSSELL, JR  2,777,564
CONVEYOR SYSTEMS
Filed Feb. 23, 1955  3 Sheets-Sheet 1

Inventor
George E. Russell, Jr.
By his Attorney

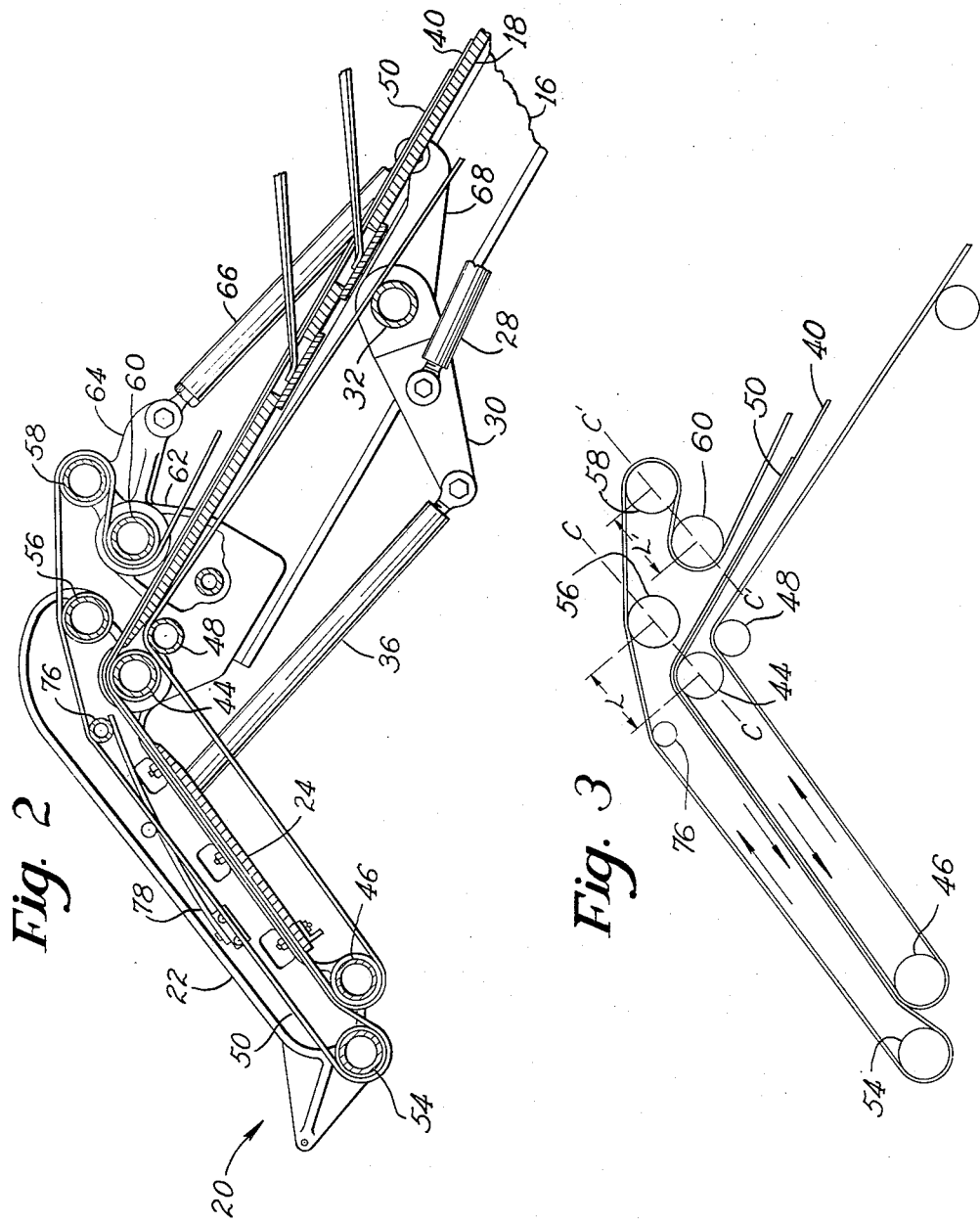

2,777,564
CONVEYOR SYSTEMS

George E. Russell, Jr., Beverly, Mass., assignor to United Shoe Machinery Corporation, Flemington, N. J., a corporation of New Jersey Application February 23, 1955, Serial No. 489,893

5 Claims. (Cl. 198—109)

The present invention relates to transfer devices for sheet-like workpieces and more particularly to conveyor systems in which an articulated portion of the system is oscillated. The preferred embodiment of my invention is herein illustrated in its application to an automatic leather stacking machine of the type described in United States Letters Patent No. 2,737,390, granted March 6, 1956, in the names of Paul E. Morgan, Arthur R. Abbott, and John J. Maciejowski. However, it is to be understood that the present invention is not limited in its utility to leather stacking machines nor to transferring leather workpieces.

In conveying workpieces it is, at times, necessary abruptly to change their direction of travel. Many systems have been devised for properly controlling workpieces as they are carried first along one path and then along another. However, in stacking machines, such as the type illustrated in the above-mentioned patent, a further problem is presented due to the fact that the portion of the conveyor system beyond the change in path of travel is articulated and oscillated. That machine, briefly, comprises a main frame and an oscillating delivery arm depending from the upper portion of the main frame in inverted V form. A conveyor system is provided for carrying workpieces upwardly along the frame and then downwardly along the delivery arm to discharge them in a work receiving zone beneath the delivery arm. Means are provided for oscillating the delivery arm in proper timed relationship to the passage of the mid-portion of the workpieces so that they will be properly balanced in most instances upon a horse.

It has been found desirable to run the conveyor system of this stacking machine at relatively high speeds in excess of 400 ft. per minute. Thus workpieces approaching the delivery arm have considerable inertia which tends to carry them upward as conveyor tapes carried by the delivery arm are changing their path of travel. With previous arrangements many workpieces would become jammed or their travel momentarily halted at this point of direction change so that the machine would either stall or the workpieces would be improperly deposited in the work treating zone. The problem of control is further complicated by the fact that the delivery arm may be in any one of several positions as the workpieces approach it. Therefore, the change in direction of travel of the workpiece is not based upon any fixed angular displacement of the path of the workpieces.

It is an object of the present invention to provide an improved conveyor system having an articulated portion which is oscillated and in which means are provided for properly controlling conveyed workpieces as they pass to the articulated portion.

It is a further object of the present invention to provide, in a leather stacking machine of the type having a depending oscillating delivery arm, means for controlling workpieces as they pass to the delivery arm.

Leather stacking machines of the type mentioned have an upwardly inclined frame from the upper end of which is pivoted an oscillatable delivery arm. A set of conveyor tapes is provided which carries workpieces upwardly along the frame and then downwardly along the delivery arm passing around a pivot roll which is journaled on the same axis as the delivery arm. In order to control workpieces as they pass from the frame to the delivery arm, I have provided a second set of conveyor tapes which are contiguous with the work engaging runs of the first-mentioned set of tapes. Thus there is, in effect, two sets of conveyor tapes which have an articulated portion which is oscillated as a unit. Therefore, regardless of the angular position of the delivery arm, the workpieces will at all times be controlled as they pass around the pivot roll, thereby eliminating any possibility of the workpiece becoming jammed or its travel interrupted. Thus the timing system for the oscillation of the delivery arm, which is predicated upon the workpieces traveling at the same rate as the conveyor tapes, will at all times function properly.

As noted above, the delivery arm is oscillated about an axis common with the axis of the pivot roll. This means that as the delivery arm is oscillated, varying amounts of the conveyors will be wrapped about the pivot roll. A pivot roll of fairly large diameter is needed for reasons of strength. Thus, the conveyor length variation is quite substantial, and conventional means for compensating for this variation will not suffice. The variation in the first-mentioned conveyor can be compensated for by passing the return run of that conveyor around a roll spaced from the lower end of the delivery arm in such manner that the distance between the roll and the delivery arm end varies inversely as the amount of wrap around the pivot roll as the delivery arm is oscillated. However, such an expedient will not suffice for the second conveyor. I therefore pass the return run of said second conveyor around a roll journaled in the upper end of the delivery arm adjacent the pivot roll, then around a movable roll, and thence about a fixed roll. The distance between the movable roll and the fixed roll is the same as the distance between the delivery arm roll and the pivot roll. Also, their angular relationships are such that lines through their axes are parallel. Means are provided for oscillating the movable roll about the fixed roll so that such lines remain at all times parallel. In this manner, as the conveyor tape length wrapped about the pivot roll is varied, the length of tape wrapped around the fixed roll is inversely varied and conversely the length of tape wrapped about the delivery arm roll and the movable roll also vary inversely. Thus the total conveyor length of said second conveyor remains a constant so that at all times there is a constant tension on the conveyor tapes.

In the drawings,

Fig. 2 is a longitudinal section of the upper portion of the machine seen in Fig. 1 on an enlarged scale and with the delivery arm in its outboard position;

Fig. 3 is a diagrammatic view of the conveyor tapes in the position shown in Fig. 2;

Figure 1:
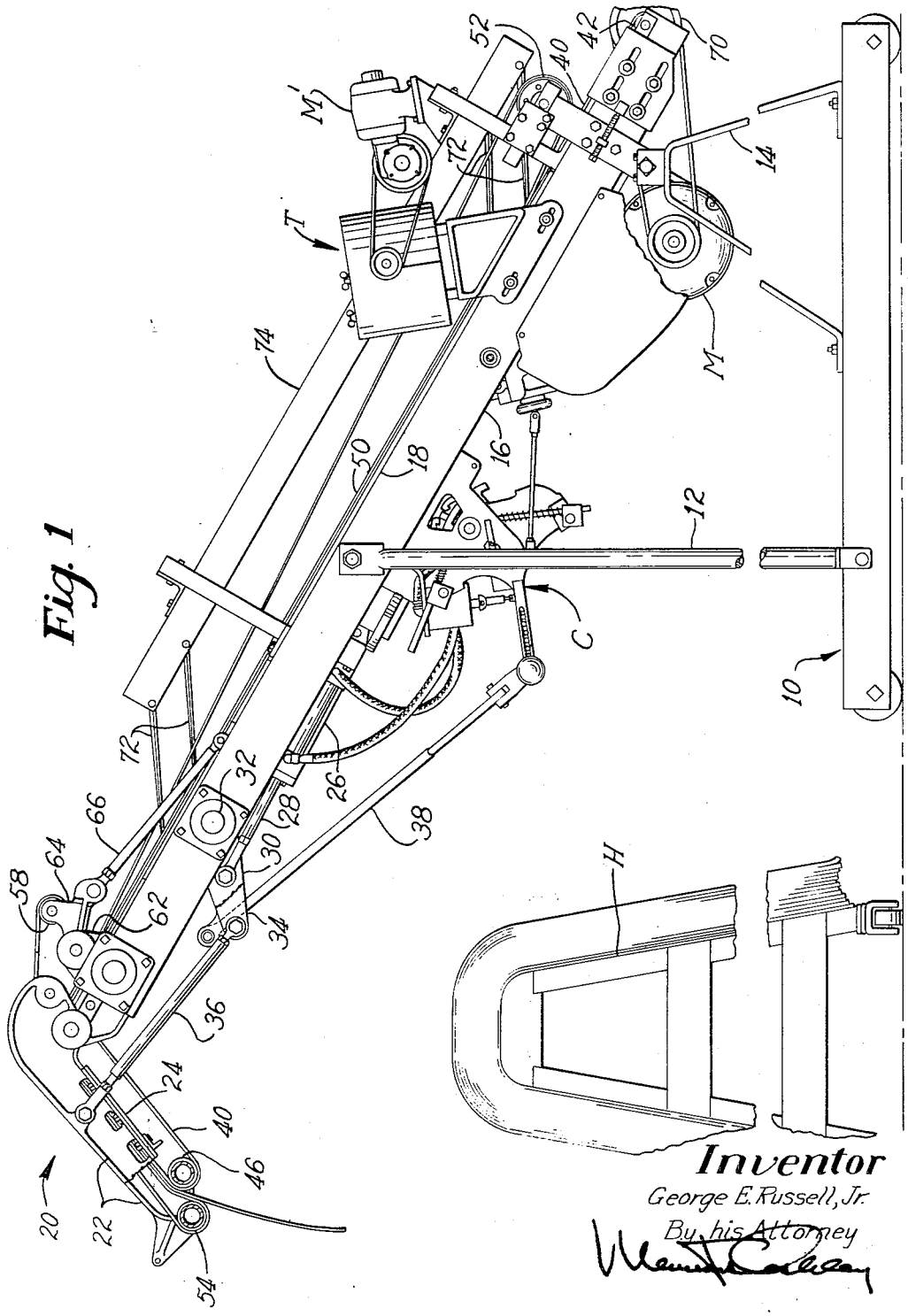
Fig. 1 is a view in side elevation of an automatic leather stacking machine in which my improved conveyor system has been incorporated.

The automatic leather stacking machine shown in Fig. 1 is of the basic type disclosed in the above-mentioned patent, although several minor alterations have been made in its construction to adapt it for commercial tannery operation. The machine is mounted on a roller base 10 from which supports 12 and 14 extend upwardly, to carry side frames 16 (only one of which is seen) on either side of the machine. An upwardly inclined support 18 extends between the frames 16. A delivery arm 20 is pivotally secured at the upper end of said side frames and comprises two frame members 22 between which a member 24 extends in order to provide rigidity for the delivery arm.

A fluid motor 26 provides means for oscillating the delivery arm 20 through the following linkage arrangement. A piston rod 28 is connected to an arm 30 which is secured to a torque shaft 32 extending between the side frames 16 and journaled therein. A second arm 34 is secured to the near end of the torque shaft 32 (Fig. 1) and two links 36 extend between the lower ends of the arms 30, 34 and the delivery arm 20. Thus as pressurized fluid is admitted to the double acting fluid motor 26 the delivery arm 20 may be moved between its inboard and outboard positions as the arms 30, 34 are moved between the positions shown in Figs. 2 and 4. A rod 38 connected to the arm 34 serves to adjust the angle of oscillation of the delivery arm through a cam controlled mechanism C which in turn controls the flow of fluid to the motor 26 in a manner fully described in the above-mentioned patent.

A lower conveyor 40 passes around a roll 42 journaled at the lower end of the side frames 16 and has a work engaging run extending upwardly along the inclined support 18, passing around a pivot roll 44 journaled at the upper end of said side frames and extending downwardly along the delivery arm 20. The pivot roll 44 is journaled on the axis about which the delivery arm 20 is oscillated. The lower conveyor 40 then passes around a roll 46 journaled in the members 22 of the delivery arm 20 to commence its return run. A roll 48 extending between the side frames 16 constrains the return run of the main conveyor so that it will properly clear the working elements of the machine as it passes to the roll 42.

A second or upper conveyor 50 passes around a roll 52 mounted above the frames 16 to commence a work engaging run in contiguous relation with the work engaging run of the lower conveyor 40. The work engaging run of the upper conveyor 50 thus extends upwardly along the support 18, around the pivot roll 44 and downwardly along the delivery arm 20. The upper conveyor then passes around a roll 54 to commence its return run, continuing upwardly around a roll 56, then around rolls 58 and 60 to the lower roll 52. The rolls 54 and 56 are journaled in the members 22 of the delivery arm 20 while the roll 60 is mounted in a fixed position being journaled in plates 62 secured to either side frame 16. The roll 58 is a movable roll mounted on arms 64 which in turn are pivotally mounted on the plates 62 about the axis of the roll 60. Links 66 connect the arms 64 to levers 68 which are secured at either end of the torque shaft 32. Thus as the torque shaft 32 is rotated to impart movement to the delivery arm 20 in one direction the roll 58 will move about the axis of the roll 60 in the same direction.

The upper and lower conveyors 50 and 40 each comprises a series of endless tapes spaced across the support 18. The spacing between the tapes facilitates the detection of workpieces and also it has been found that relatively narrow tapes provide ease of manufacture and assembly as well as having better tracking characteristics. A motor M drives the lower conveyor 40 through a pulley 70 secured to the shaft of the roll 42. No interconnection is made between the rolls of the upper and lower conveyor systems as it has been found that the friction between the contiguous runs of these two conveyors is sufficient for driving the upper conveyor.

Figure 4:
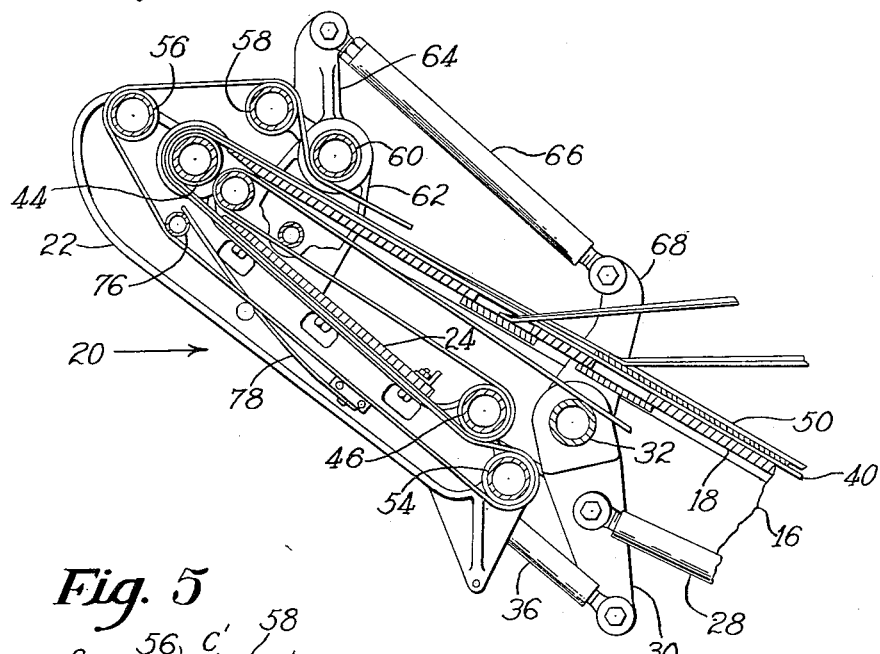
Fig. 4 is a view similar to Fig. 2 with the delivery arm in its inboard position.
Figure 5:
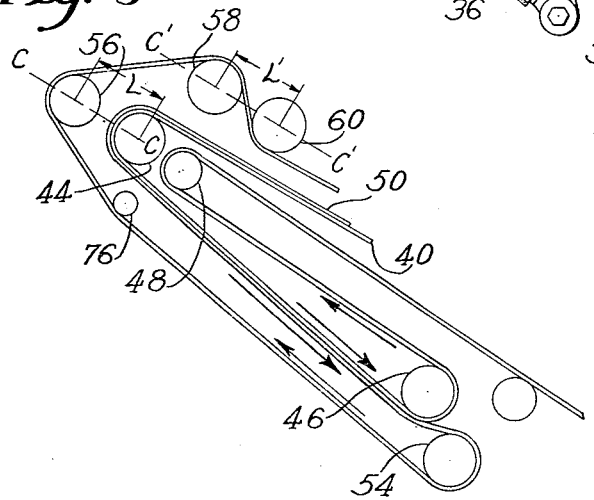
Fig. 5 is a diagrammatic view of the conveyor tapes in their position shown in Fig. 4.

Detector fingers 72 of the type described in United States Letters Patent No. 2,743,924, granted May 1, 1956, in the names of Richard M. Elliott and Edmund S. Lee III, extend between the tapes of the upper and lower conveyors 50 and 40 and enter recesses in the support 18. The fingers 72 are pivotally mounted on a framework 74 above the support 18 and are arranged in two stations so that they will be displaced as a workpiece is conveyed up the support 18 and thereby selectively detect the passage of the leading and trailing edges of the workpiece. Workpiece detection is indicated in Fig. 4. The detections made by the fingers 72 are transmitted to a timing mechanism T, of the type also described in the last-mentioned patent, which actuates the control mechanism C to cause oscillation of the delivery arm 20. An independent motor M' drives the timing mechanism T. The upper and lower conveyors are driven constantly by the motor M and in the operation of the machine leather workpieces are introduced at the lower end of the conveyor 40 either directly from a through feed leather treating machine or by means of some intermediate transfer means. The workpieces are carried upwardly between the conveyors 40 and 50. As their leading and trailing edges pass the detector fingers 72, electrical impulses are transmitted to the timing mechanism T which initiates a computing cycle within the timing mechanism. The workpieces are carried around the pivot roll 44 and discharged from the lower end of the delivery arm 20. It will be noted that as the workpieces pass around the pivot roll 44 they are confined on both sides by the conveyors 40 and 50, respectively, whether the delivery arm is in its outboard position shown in Fig. 2 or in its inboard position shown in Fig. 4. With this arrangement there is no possibility of the workpiece becoming jammed as its direction of travel is abruptly changed to pass it along the delivery arm. The timing mechanism T actuates the control mechanism C at a time dependent upon the workpiece length as determined by the impulses transmitted in response to displacement of the fingers 72. The cam mechanism C thereupon causes pressurized fluid to be introduced into one end of the fluid motor 26, dependent upon the initial position of the delivery arm 20. The delivery arm 20 is thus oscillated through the linkage system comprising the piston rod 28, arms 30, 34 and links 36 in proper time relationship so that each workpiece will be placed upon a horse H with equal portions of the workpiece lying on either side of the horse. Reference may be made to Figs. 3 and 5 which illustrate more clearly the method in which workpieces are confined as they are carried around the pivot roll 44. The mode of operation of the cam mechanism C and timing mechanism T form no part of the present invention; reference is therefore made to the above-mentioned patents for the details of their construction.

Referring again to Figs. 3 and 5 it will be noticed that there is a substantial difference in the length of conveyor tape which is wrapped around the pivot roll 44 in its inboard and outboard positions. If tape length were based upon the inboard position of the delivery arm (Fig. 5), the tapes would be so long in the outboard position (Fig. 3) that there would not be sufficient tape tension to drive the conveyors. It is therefore necessary that this change in tape length be compensated for. In the case of the lower conveyor 40 this change in tape length is compensated for by the fact that the distance between the rolls 46 and 48 increases substantially the same amount as the amount of tape which is unwrapped from the roll 44 as the delivery arm is moved from its inboard position to its outboard position. Likewise, on reverse movement of the delivery arm 20 the increase in the amount of wrap is compensated for as the distance between the rolls 46 and 48 decreases.

The simple compensating means which suffice for the lower conveyor 40 unfortunately cannot be adapted for use with the upper conveyor 50 since it is impossible to locate a roll equivalent to the roll 48 in any practical manner. The rolls 58, 60 have therefore been provided to effect the necessary tape length compensation. Referring to Figs. 3 and 5, it will again be noted that there is considerable variation in the length of tape wrapped around the pivot roll 44 in the extreme inboard and outboard positions of the delivery arm 20. It will also be noted that the amount of tape wrapped around the fixed roll 60 varies inversely as the amount of tape wrapped around the pivot roll 44. In this way, primarily, the difference in wrap about the pivot roll 44 is compensated for. It has been found preferable, in order to maintain the length of the upper conveyor 50 at all times a constant to also wrap that conveyor about the movable roll 58 and the roll 56. Thus, the amount of wrap around the rolls 56, 58 varies inversely between the inboard and outboard position of the delivery arm 20 so that the sum of the lengths wrapped around these two rolls remains a constant. In accomplishing this end, the relationship between the four rolls 44, 56, 60 and 58 have a special significance. The distance L between the rolls 44, 56 is the same as the distance L' between the rolls 60 and 58. Also, the lines c—c and c'—c' drawn through the axes of the rolls 44, 56 and 60, 58, respectively, are parallel. The distance between the torque shaft 32 and the links 36 bears the same ratio to the distance between the pivot roll 44 and the point of attachment of the links 36 to the delivery arm 20 as the distance from the torque shaft 32 to the point of attachment of the links 66 is to the distance between the links 66 and the center of rotation of the movable roll 58. With this arrangement, the lines c, c and c', c' remain at all times parallel as the delivery arm 20 is oscillated between its inboard and outboard positions. Thus for any position of the delivery arm 20 the length of tape wrapped around the rolls 44, 56, 58 and 60 is a constant.

A further compensating device is shown in the form of a bar 76 which is urged outwardly by a flat spring 78. The spring-loaded bar 76 is, however, intended only to compensate for changes in tape length due to varying humidity conditions and other normal conditions encountered in the use of the machine. A similar bar may be provided for the lower conveyor 40, although one is not shown in the present disclosure.

Having thus described my invention, what I claim as new and desire to secure by Letters Patent of the United States is:

1. A conveyor system comprising a first conveyor having a work engaging run extending upwardly around a pivot roll and then downwardly, a second conveyor having a single run contiguous with substantial portions of the work engaging run of said first conveyor, means for oscillating the downwardly extending portions of said contiguous runs as a unit about said pivot roll, said second conveyor having its return run extending above its downwardly extending portion, means within said return run for compensating for variations in conveyor length due to oscillation of said contiguous runs, said means including a fixed roll and a movable roll about which the return run passes, and means operated by said oscillating means for moving said movable roll to wrap more or less of the return run about the fixed roll to compensate for varying amounts of conveyor which are wrapped around said pivot roll.

2. A conveyor system comprising a first conveyor having a work engaging run extending upwardly around a pivot roll and then downwardly, a second conveyor having a single run contiguous with substantial portions of the work engaging run of said first conveyor on both sides of said pivot roll, means for oscillating the downwardly extending portions of said contiguous runs as a unit about said pivot roll, said second conveyor having its return run extending above its downwardly extending portion, means within said return run for compensating for variations in conveyor length due to oscillation of said contiguous runs, said means including a roll carried with the oscillated portion of said conveyors, a fixed roll and a movable roll about each of which the return run passes, and means for moving said movable roll in such manner that the length of conveyor wrapped about the pivot roll, the oscillated roll, the fixed roll and the movable roll at all times remains a constant.

3. A conveyor system comprising a first conveyor having a work engaging run extending upwardly around a pivot roll and then downwardly, a second conveyor having a single run contiguous with substantial portions of the work engaging run of said first conveyor on both sides of said pivot roll, means for oscillating the downwardly extending portions of said contiguous runs as a unit about said pivot roll, said second conveyor having its return run extending above its downwardly extending portion, means within said return run for compensating for variations in conveyor length due to oscillation of said contiguous runs, said means including a roll carried with the oscillated portion of said conveyors, a fixed roll and a movable roll about each of which the return run passes, the distance between said oscillated roll and said pivot roll being the same as the distance between said fixed roll and said movable roll, said rolls also being mounted so that a line through the axes of said pivot roll and said oscillated roll and a line through the axes of said fixed roll and said movable roll are parallel, and means for oscillating said movable roll about said fixed roll as said contiguous runs are oscillated so that the lines through the named axes remain at all times parallel whereby the length of conveyor wrapped about the pivot roll, the oscillated roll, the fixed roll and the movable roll remains a constant.

4. A stacking machine having, in combination, a main frame, a depending delivery arm, a pivot roll about which said delivery arm is oscillated, a lower conveyor having a work engaging run extending along said frame around said pivot roll and downwardly along said delivery arm, an upper conveyor having a run which is contiguous with the work engaging run of said lower conveyor on both sides of the pivot roll whereby workpieces are caused to change their direction of travel as they pass from said frame to said delivery arm, said upper conveyor having its return run extending above said lower conveyor, means for oscillating said delivery arm, and means for compensating for changes in conveyor length as said delivery arm is oscillated, said compensating means including a roll journaled in the delivery arm adjacent the pivot roll, a fixed roll and a movable roll about each of which said return run passes, and means for moving said movable roll as the delivery arm is oscillated whereby the length of conveyor wrapped about the delivery arm roll, the pivot roll, the fixed roll and the movable roll remains a constant at all times.

5. A stacking machine having, in combination, a main frame, a depending delivery arm, a pivot roll about which said delivery arm is oscillated, a lower conveyor having a work engaging run extending along said frame around said pivot roll and downwardly along said delivery arm, an upper conveyor having a run which is contiguous with the work engaging run of said lower conveyor on both sides of the pivot roll whereby workpieces are caused to change their direction of travel as they pass from said frame to said delivery arm, said upper conveyor having its return run extending above said lower conveyor, means for oscillating said delivery arm, and means for compensating for changes in conveyor length as said delivery arm is oscillated, said compensating means including a roll journaled in said delivery arm adjacent said pivot roll, a fixed roll and a movable roll about each of which said return run passes, the distance between said delivery arm roll and said pivot roll being the same as the distance between said fixed roll and said movable roll, and said rolls being mounted so that a line drawn through the axes of the delivery arm roll and pivot roll is parallel to a line drawn through the axes of said fixed roll and said movable roll, means for oscillating said movable roll about said fixed roll as said delivery arm is oscillated whereby the lines through the named axes at all times remain parallel, thus making the length of conveyor wrapped about the delivery arm roll, the pivot roll, the fixed roll and the movable roll a constant.

References Cited in the file of this patent

UNITED STATES PATENTS

| | | |
|---|---|---|
| 2,250,502 | Rundell | July 29, 1941 |
| 2,309,671 | Saul | Feb. 2, 1943 |

FOREIGN PATENTS

| | | |
|---|---|---|
| 661,408 | Germany | July 2, 1938 |
| 116,436 | Sweden | May 21, 1946 |